434-22 SP
2/3/87 OR H 000,218

United States Statutory Invention Registration [19]

[11] Reg. Number: H218
[43] Published: Feb. 3, 1987

Marshall et al.

[54] WEAPON TRAINER USING IR RADIATION EMITTED FROM TARGET

[75] Inventors: Albert H. Marshall, Orlando; Randy R. Fields, Winter Park, both of Fla.

[73] Assignee: The United States of America as represented by the Secretary of the Navy, Washington, D.C.

[21] Appl. No.: 862,337

[22] Filed: May 12, 1986

[51] Int. Cl.[4] ..... F41G 3/26
[52] U.S. Cl. ..... 434/22

*Primary Examiner*—Deborah L. Kyle
*Assistant Examiner*—Michael J. Carone
*Attorney, Agent, or Firm*—Robert F. Beers; Robert W. Adams; Edward V. Hiskes

[57] ABSTRACT

A marksmanship training system has been developed which depends upon the normal levels of infrared radiation emitted from warm-blooded animals, such as humans. An infrared detector is mounted upon a simulated rifle or unloaded real rifle, or other weapon. This detector is mounted with IR lenses in such a way that a positive indication is given when the rifle is pointed at a suitable infrared emitting animal target. A second detector indicates when the trigger of the weapon is pulled. If a trigger pull is detected at a time when an animal infrared signal is present, the system generates an electronic pulse indicating that a target hit has occurred. This pulse may be used to drive a visible or audible signaling device to inform the user of success.

6 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WEAPON TRAINER USING IR RADIATION EMITTED FROM TARGET

BACKGROUND OF THE INVENTION

Numerous training devices have been developed which allow marksman to be trained without the use of expensive and dangerous live ammunition. However, most such devices require that the training take place under unrealistic conditions, such as when special targets containing light sources are used. Furthermore, even live fire training takes place under artificial conditions, compared to those conditions found in actual warfare, since the fire must be confined to target ranges and confined in narrow paths for safety reasons.

Accordingly, it is an object of this invention to provide a marksmanship training device which can be used under fully realistic conditions against the actual types of targets that would be encountered in warfare.

Another object of this invention is to provide a lightweight and inexpensive training system that does not require expensive dedicated buildings or land to enclose target ranges.

To achieve these and other objects, a system has been developed which depends upon the normal levels of infrared radiation emitted from warm blooded animals, such as humans. A pyroelectric long wave length infrared detector is mounted upon a simulated rifle or unloaded real rifle, or other weapon. This detector is mounted on the end of a rifle and boresighted with the rifles sights in such a way that a positive indication is given when the rifle is pointed at a suitable infrared emitting animal target. A second switch indicates when the trigger of the weapon is pulled. If a trigger pull is detected at a time when an animal infrared signal is present, the system generates an electronic pulse indicating that a target hit has occurred. This pulse may be used to drive a visible or audible signaling device to inform the user of success.

SUMMARY OF THE INVENTION

A marksmanship training system comprising an infrared detector mounted upon a simulated rifle or unloaded real rifle, or other weapon. This detector is mounted with lenses in such a way that a positive indication is given when the rifle is pointed at a suitable infrared emitting animal target. A second detector indicates when the trigger of the weapon is pulled. If a trigger pull is detected at a time when an animal infrared signal is present, the system generates an electronic pulse indicating that a target hit has occurred. This pulse may be use to drive a visible or audible signaling device to inform the user of success.

DESCRIPTION OF THE PREFERRED EMBODIMENT

Figure 1:
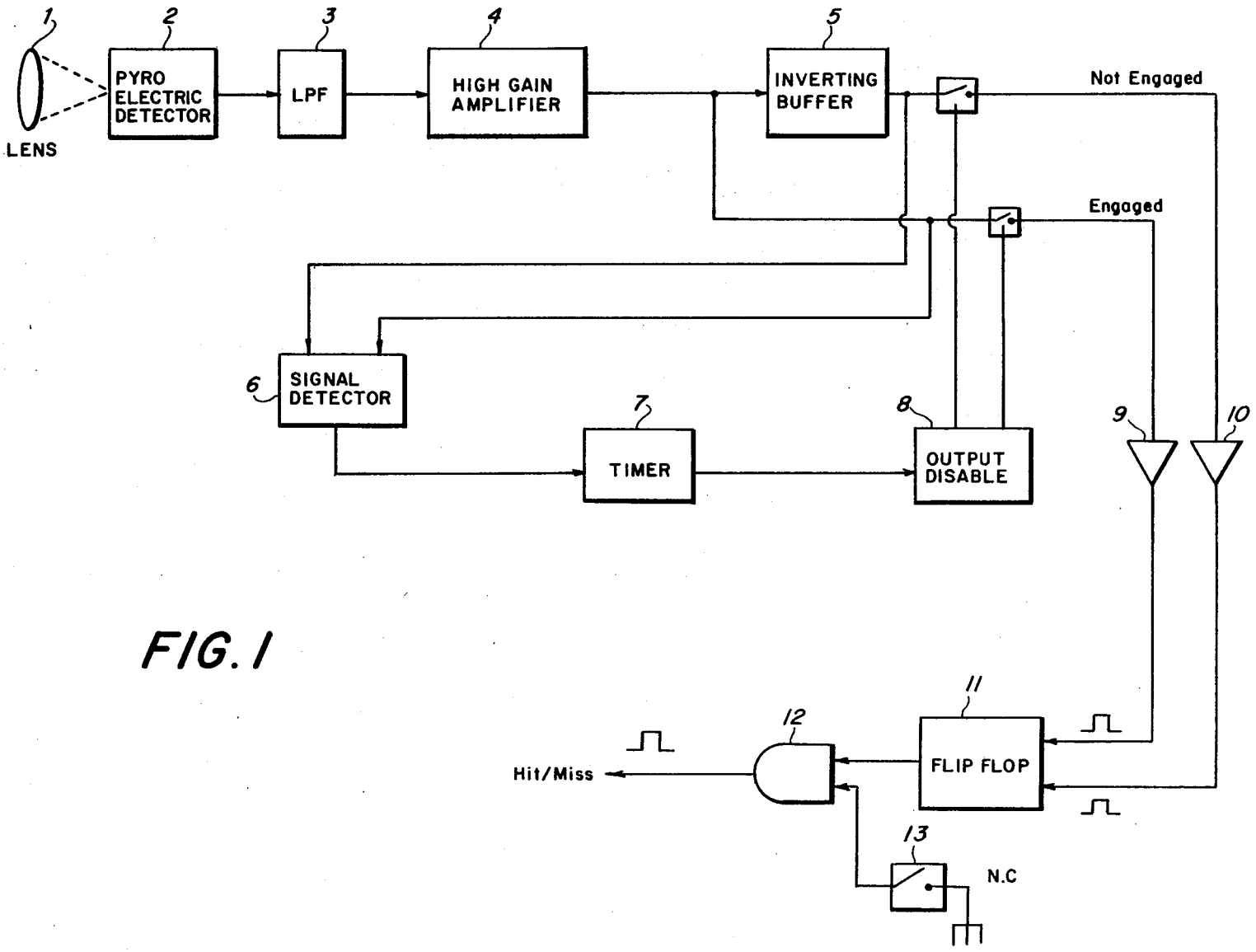
FIG. 1 is a block diagram of the training system described herein.

FIG. 1 is a schematic of the weapon trainer system and IR lens. Lens 1, is used to focus infrared energy being emitted from a human target onto a pyro electric detector 2, which detector provides an alternating current output signal from an internal chopper.

A man at 98 degrees F. radiates longwave infrared energy of wavelengths in the 10 to 14 micron region. Thus, lens 1 must be chosen so that it can operate at these long wavelengths and properly focus energy onto the detector. A lense with a narrow field of view combined with a detector sensitive to 10 to 14 micron wavelengths will indicate the presence of a man-target only when the lense is pointed at the target. Preferably, the lens and detector are mounted upon a weapon in a manner such that the targets identified by the lens and detector are the same as those that would be identified by the normal sight of the weapon.

The output of detector 2 is processed by low pass filter 3. This filter eliminates high frequency noise generated in the environment and in the detector itself. This noise would otherwise cause false indications of successful target hits.

The output of the filter 3 is amplified by high gain amplifier 4. An inverted output is provided by inverting buffer 5.

In order to screen out false signals caused by detector ringing and other forms of noise, output from the detector/amplifier system is blocked for a short period after target acquisition by the output of timer 7. This blocking is accomplished by output disabling circuit 8.

The RESET output from amplifier 4 and SET output from inverting buffer 5 is passed through amplifiers 9 and 10 to the set and reset inputs of flip-flop 11.

If a valid target is engaged at a given point in time, the flip-flop output to AND gate 12 will be true. If target engagement is lost, the RESET line will cause the flip-flop to output a false signal to AND gate 12.

Trigger switch 13 is normally open, and thus normally provides a false signal to the other input of AND gate 12. When the trigger is pulled, the switch opens and a true signal is applied to the AND gate input. If the other AND input is also true at that moment, the output of AND gate 12 will also indicate true. This means that the trigger was pulled at a time when the rifle was properly targeted.

Figure 2:
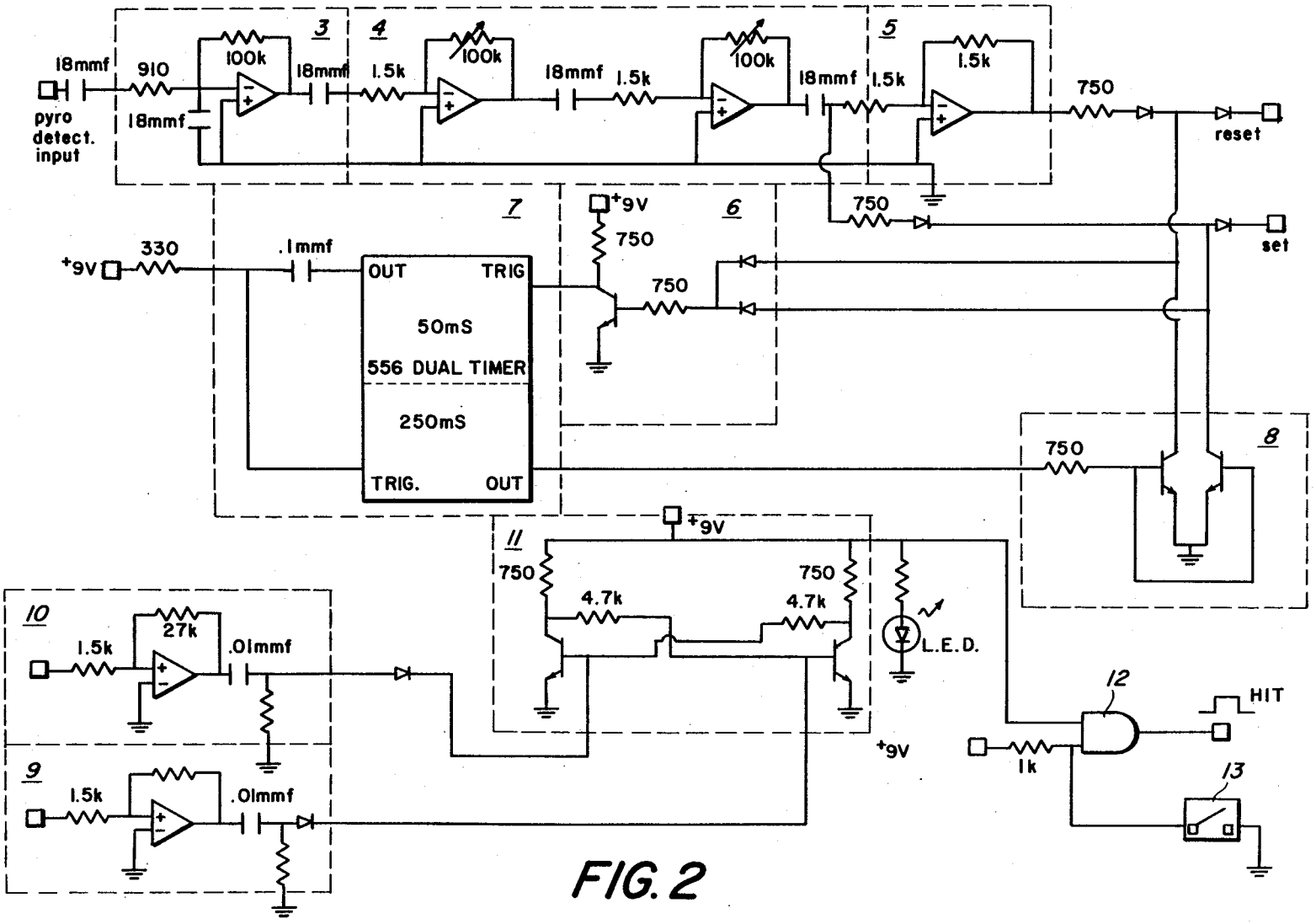
FIG. 2 is the electrical schematic of an actual embodiment of the system.

FIG. 2 is a detailed schematic of a particular embodiment of the invention. The chopper modulated output from the infrared detector is passed through the low pass filter 3 and amplifier 4. The SET output of amplfier 4 is passed through amplifier 9 to flip-flop 11. The output of amplifier 4 is also inverted by inverting buffer 5. The RESET output of buffer 5 is passed through amplifier 10 to flip-flop 11.

The SET and RESET outputs of 4 and 5 are also sent to timer 7 via signal detector 6. The timer output activates output disabling circuit 8. The net effect of the operations of 6, 7, and 8 is to disable the SET and RESET lines for a short period of time, in this case 250 mS, after any change in the status of these lines is detected. If the change in status does not last for at least 250 mS, the timer 7 will time out, and the output diable circuit 8 will also cease to function. Once this happens, the new status of the SET and RESET lines is available to flip-flop 11 via amplifiers 9 and 10. The output of flip-flop 11 is correlated with the pulling of trigger switch 13 by AND gate 12. If 13 is activated when 11 is SET, 12 will output a pulse. This pulse can be used to activate a signal indicating that a target hit has occurred.

What we claim is:

1. A weapons training device comprising:

means for detecting infrared radiation emitted by warm-blooded animals, including humans and heated targets;

a simulated rifle; and means for detecting when the trigger of the said simulated rifle is pulled;

wherein the said means for detecting infrared radiation is mounted upon the rifle in such a manner as to detect radiation emitted by said animals at such times as the rifle is properly targeted at said animals.

2. The training device of claim 1 wherein the said means for detecting infrared radiation comprises a pyroelectric detector.

3. The training device of claim 2 wherein said means further comprise a low pass filter.

4. The training device of claim 3 wherein said means for detecting when the trigger is pulled comprises a switch and a logic gate.

5. The training device of claim 4 wherein said logic gate is an AND gate.

6. The training device of claim 5 wherein the said means for detecting infrared radiation further comprise an inverting buffer, a timer, an output disabling circuit, and a flip-flop wherein the output of said flip-flop is connected to an input of said AND gate.

* * * * *